Oct. 4, 1938.   H. W. LORD   2,132,267

HEAVY ALTERNATING CURRENT MEASUREMENT

Filed July 31, 1937

Inventor:
Harold W. Lord,
by Harry E. Dunham
His Attorney.

Patented Oct. 4, 1938

2,132,267

UNITED STATES PATENT OFFICE 2,132,267

HEAVY ALTERNATING-CURRENT MEASUREMENT

Harold W. Lord, Schenectady, N. Y., assignor to General Electric Company, a corporation of New York Application July 31, 1937, Serial No. 156,746

4 Claims. (Cl. 171—95)

My invention relates to the measurement of heavy alternating currents and its object is to avoid the use of the expensive and massive current-transforming devices that are ordinarily employed in making such alterating-current measurements.

The invention is particularly useful for measuring the current in a resistance welding circuit where the momentary current values may be of the order of from 50,000 to 200,000 amperes.

In carrying my invention into effect, I employ a pick-up coil inductively associated with the heavy-current circuit to be metered. This might be considered as an air core transformer connected between the circuit to be metered and an instrument circuit. The instrument circuit includes an inductance in order that the current therein will have a wave shape which corresponds to the wave shape of the current to be measured. In some cases, I may combine the pick-up coil and waveshape-correcting reactance into a single device.

Figure 1:
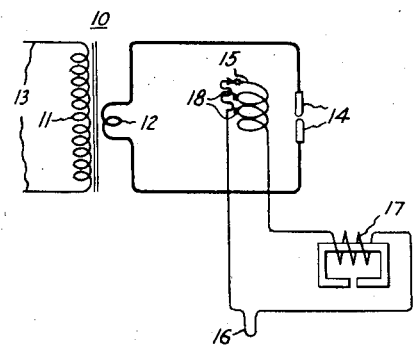
Figure 2:
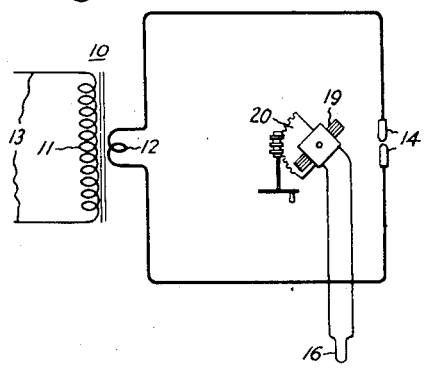
Figure 3:
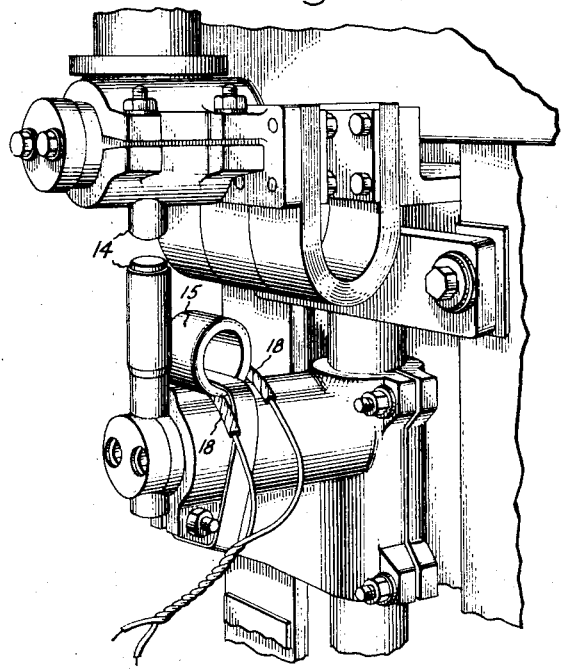

The features of my invention which are believed to be novel and patentable will be pointed out in the claims appended hereto. For a better understanding of my invention, reference is made in the following description to the accompanying drawing in which Fig. 1 represents the circuit connections according to my invention for obtaining an oscillograph record of the current flowing in a resistance welding circuit; Fig. 2 represents a circuit for the same purpose wherein the pick-up coil and inductance are combined; and Fig. 3 shows a perspective view of a portion of a resistance welder with my pick-up coil in measuring position thereon.

Referring now to the drawing for a detail description, in Figs. 1 and 2, 10 represents a transformer having a primary 11 and secondary 12 connected between an alternating-current source of supply 13 and the electrodes 14 of a resistance welder. The transformer 10 is designed to produce a very large low-voltage secondary current suitable for resistance welding purposes. The welding current through the electrodes 14 may, for example, reach momentarily values up to 200,000 amperes or more.

It is impracticable to use the conventional design of current-measurement transformer or shunt in the welding circuit where such large current magnitudes are involved. It is desirable, however, to obtain a proportional instrument current of the same wave shape as that of the welding current. In accordance with my invention, this is accomplished by placing a pick-up coil 15 in the throat of the welder where it is inductively related to the welding circuit, and connecting an instrument, such as an oscillograph element 16, in circuit with this pick-up coil. Thus in Figs. 1 and 2 the welding circuit comprises a single turn loop with which the pick-up coil is in loose inductive relation. The voltage $e$ induced in the pick-up coil is a function of the mutual inductance $m$ between such coil and welding circuit and the rate of change of current $$\frac{di}{dt}$$

in the welding circuit, thus $$e = m\frac{di}{dt}$$

It is necessary to include a reactor 17 in the measuring circuit in order that the current therein shall deflect the oscillograph element 16 in accordance with the wave shape of the welding current. The instrument circuit should be of low resistance as compared to its inductance. Neglecting the effect of resistance the current $i_1$ in the oscillograph circuit is then related to the voltage $e$ induced in the pick-up coil in accordance with the expression $$e = L\frac{di_1}{dt}$$

where L is the inductance of the reactor 17 and $$\frac{di_1}{dt}$$

represents the rate of change of current in the oscillograph circuit.

We may combine the above two equations by eliminating the common factor $e$, thus $$m\frac{di}{dt} = L\frac{di_1}{dt}$$

$m$ and $L$ are circuit constants and hence $$i = i_1 k$$

where $k$ is a constant depending upon the circuit constants. Thus, the current $i_1$ flowing in the oscillograph is proportional to the welding current $i$, and these currents have substantially the same wave shape and phase relation. The proportionality between $i$ and $i_1$ can be determined by calibration. However, since the calibration depends upon the mutual inductance between the pick-up coil and welding circuit, the pick-up coil should be immovably placed in the throat of the welder before calibration and not moved thereafter without recalibration. The transformation ratio between $i$ and $i_1$ is of the order of $$\frac{50000}{1}$$

and above.

A measurement of the oscillograph deflection for a known welding current provides a reasonably accurate overall calibration. The welding current for low heats with the electrodes short-circuited may be fairly accurately determined by measuring the steady state current in the primary of transformer 10 and multiplying this value by the turn ratio of this transformer. The pick-up coil may be provided with different taps, such as indicated at 18, Fig. 1, for convenience in varying the calibration to suit the different operating currents for different welding conditions. In order to give a practicable example but not by way of limiting the invention, it has been found that the pick-up coil may have eight hundred turns of No. 25 enameled wire wound on a two-inch diameter tube three inches long and may have taps at two hundred and four hundred turns. This coil weighs about ten ounces. The reactor used at 17 with this pick-up coil is an iron core reactor with a small air gap rated at one henry with .3 ampere direct current through its winding and weigh about one pound. The placing of the pick-up coil on a resistance welding machine is represented in Fig. 3.

As shown in Fig. 2, the pick-up coil 15 and reactor 17 of Fig. 1 may be combined by using a reactor 19 as both pick-up coil and reactor. Such pick-up reactor must be placed relative to the welding circuit so that the current flowing in the oscillograph vibrator circuit is just sufficient for a good deflection. Too strong a field in the pick-up reactor will saturate the iron thereof and cause distortion in the recording.

If the pick-up reactor is used and the welding current varies over a considerable range, it will be advisable to mount the pick-up reactor so that it may be turned through an arc of ninety degrees by means such as indicated in Fig. 2 at 20 and thus vary its inductive relation with respect to the welding circuit for different ranges of welding current. The calibration of the instrument circuit current will, of course, vary with the position of the pick-up reactor and, after being calibrated, different rotary positions of the reactor may be marked with the proper calibration constants.

The instrument at 16 instead of being of the recording type may obviously be of the indicating type.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. In combination, a primary circuit in which alternating current of from 50,000 to 200,000 amperes may flow, apparatus for measuring such currents in said circuit comprising, a pick-up coil loosely inductively related to said circuit, an instrument supplied by said pick-up coil, and a reactor having an iron core containing an air gap connected in series with said instrument and pick-up coil, said reactor serving to cause the wave shape of the current induced in said instrument circuit through said pick-up coil to be similar to the wave shape of the current in the primary circuit, the ratio between the currents in the primary and instrument circuits being not less than $$\frac{50,000}{1}$$

2. In combination, an alternating-current welding machine having electrodes and electrical supply conductors leading to the electrodes and forming a single-turn conductor loop when current flows through said conductors and between said electrodes in a welding operation, means for obtaining a record of the current flow in said conductors comprising, a coil inserted in such loop so as to form therewith a loosely coupled mutual inductance coupling, an electrical recording device of the oscillograph type connected to be energized from said coil, and a reactance included in the energizing circuit of said recording device for causing the wave shape of the current induced therein through said mutual inductance coupling to conform to the wave shape of the current flow in the welder supply conductors.

3. In combination, a heavy-current alternating-current circuit forming a single-turn loop, means for measuring the current flow in said circuit comprising, a coil placed within said loop so as to have a voltage induced therein when current flows in said circuit, which voltage is proportional to the rate of change of current in said circuit and the mutual inductance between said loop and coil, and a measuring circuit containing a current-measuring device upon which the voltage induced in said coil is impressed, said measuring circuit containing sufficient inductance to cause the wave shape of the current in the instrument circuit to be similar to the wave shape of the current in the heavy-current circuit.

4. In combination, a heavy-current alternating-current circuit in which currents of the order of 100,000 amperes may flow, means whereby the value and wave form of the current in such circuit may be recorded comprising, a coil mutually inductively related to said circuit, an iron core containing an air gap for said coil, said core and coil being mounted for relative movement with respect to said circuit, whereby the mutual inductive relation may be varied, and an oscillograph recording element energized from said coil.

HAROLD W. LORD.